US007016855B2

(12) United States Patent
Eaton et al.

(10) Patent No.: US 7,016,855 B2
(45) Date of Patent: Mar. 21, 2006

(54) METHOD AND APPARATUS FOR MANAGING A TASK LIST USING LOCATION BASED FILTERING

(75) Inventors: Eric Thomas Eaton, Lake Worth, FL (US); Von Alan Mock, Boynton Beach, FL (US); David Jeffery Hayes, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 670 days.

(21) Appl. No.: 10/161,287

(22) Filed: May 31, 2002

(65) Prior Publication Data

US 2003/0225589 A1 Dec. 4, 2003

(51) Int. Cl.
 *G06F 17/60* (2006.01)
(52) U.S. Cl. .................. 705/1; 705/1; 705/26; 340/988
(58) Field of Classification Search .................... 705/1, 705/26
 See application file for complete search history.

(56) References Cited

U.S. PATENT DOCUMENTS

| | | | | |
|---|---|---|---|---|
| 5,444,444 | A | * | 8/1995 | Ross ........................ 340/994 |
| 5,878,401 | A | * | 3/1999 | Joseph ....................... 705/22 |
| 6,177,905 | B1 | | 1/2001 | Welch |
| 6,317,718 | B1 | | 11/2001 | Fano |
| 6,411,899 | B1 | * | 6/2002 | Dussell et al. .............. 701/211 |
| 6,512,919 | B1 | | 1/2003 | Ogasawara |
| 6,958,692 | B1 | * | 10/2005 | Ratschunas ............ 340/539.13 |
| 2002/0032020 | A1 | | 3/2002 | Brown et al. |
| 2002/0035538 | A1 | | 3/2002 | Moreau |
| 2002/0067308 | A1 | * | 6/2002 | Robertson .............. 342/357.17 |
| 2002/0087401 | A1 | | 7/2002 | Leapman et al. |
| 2003/0195811 | A1 | * | 10/2003 | Hayes et al. .................. 705/26 |

FOREIGN PATENT DOCUMENTS

EP          1008946 A1 *  6/2000

OTHER PUBLICATIONS

Grace Callelman, "Ask Your Cellphone Where You Are", Jul. 4, 2000, Financial Post.*
Kunz, Thomas. Wireless Communication Mobile Computing Carleton University May 20, 1998, [retrieved on Jun. 16, 2003]. Retrieved from the Internet: URL:http://web.archieve.org/web/19980520015447/http://kunz-pc.sce.carleton.ca/mobile.research.

* cited by examiner

Primary Examiner—Naresh Vig
(74) Attorney, Agent, or Firm—Andrew S. Fuller; Sylvia Chen

(57) ABSTRACT

A method for managing a task list utilizes location-based filtering to generate a reminder to a user of a communication device to perform an outstanding task. The communication device is provided with information on an outstanding task associated with a particular site and at least one proximity parameter for triggering a reminder for performing the outstanding task at a particular site (420). The communication device obtains geographic location information for the particular site and obtains information on its current location (430, 440). The device determines whether it is located within an area in which the outstanding task can be completed, which area is defined by a boundary established based at least in part on the geographic location of the particular site, and on the proximity parameter specified (450). A reminder is generated for the outstanding task when the communication device enters within this area, and also preferably generated if the communication device leaves the site or area without receiving a notification of task completion (470, 480, 490, 495).

15 Claims, 5 Drawing Sheets

FIG. 5

TASK LIST 500

| ITEM | TASK | START PROXIMITY | END PROXIMITY | DEADLINE |
|---|---|---|---|---|
| DIGITAL CAMERA | PURCHASE | 15 MIN/ 5 KM | 15 MIN/ 5 KM | NONE |
| FPL BILL | PAY BILL | 10 MIN/ 5 KM | 20 MIN/ 10 KM | MAY 31, 2002 |

510 — first data row
520 — second data row

FIG. 6

ASSOCIATE SITES 600

| SITE NAME | LOACATION | CHARACTERISTICS | PREFERENCES |
|---|---|---|---|
| PRO-CAMERA | 1st STREET | 24 HOURS | 1 |
| PRO-CAMERA | 2nd STREET | 11a.m.–10p.m. | 2 |
| CAMERA-DISCOUNT | 3rd STREET | | |
| JOE'S DIGITAL | 4th STREET | | |

610, 620, 630, 640

METHOD AND APPARATUS FOR MANAGING A TASK LIST USING LOCATION BASED FILTERING

FIELD OF THE INVENTION

The present invention relates generally to communication devices, and more particularly, to personal mobile devices having integrated reminder functions.

BACKGROUND OF THE INVENTION

Feature rich personal wireless devices are now common personal accessories. Such devices include mobile phones, personal digital assistants, and one-way and two-way paging devices, among others. Oftentimes, these devices include a calendaring or task reminder system that notifies a user of an appointment or pending task. Ordinarily, the user configures the system with a description of an item and an associated completion or appointed time, which may include date information. An alert is triggered when the current calendar time coincides with the specified time of one or more configured items. The reminder function is one of the more popular features among users of personal digital assistants and high-end mobile phones.

Recently, there has been an effort to include location-determining capabilities in mobile devices. Location information may be provided through receivers for the well-known Global Positioning System (GPS), a satellite based system, or through land-based transmitters, among other possibilities. The potential availability of current location information has resulted in various application proposals. One such proposal is described in U.S. Pat. No. 6,317,718, issued to Fano on Nov. 13, 2001 for a System, Method And Article Of Manufacture For Location-Based Filtering For Shopping Agent In The Physical World. Here, a user inputs one or more items of interest into a personal digital assistant (PDA). The location of the user is determined and a query that includes the user location and the items of interest made to a network. The PDA then presents the user with customized offers from local stores having the items of interest. This shopping agent example is just one of the proposed applications which suggest that people are increasingly interested in having practical functions integrated in personal mobile devices.

Users continue to seek improvements in familiar personal mobile device applications and additional functionality to extend their usefulness. Task list management is one such application and shopping assistance another in which an extension of functionality is needed.

BRIEF DESCRIPTION OF THE DRAWINGS

Objects and advantages of the present invention will be more readily apparent from the following detailed description of preferred embodiments thereof when taken together with the accompanying drawings in which:

FIG. 5 shows a portion of a task list derived from user configuration, in accordance with the present invention;

FIG. 6 shows a portion of the site information derived for an entry in a task list, in accordance with the present invention.

DETAILED DESCRIPTION OF THE PREFERRED EMBODIMENTS

Generally, the present invention provides for a method for managing a task list that utilizes location-based filtering to generate a reminder to a user of a communication device to perform an outstanding task. The communication device is provided with information on an outstanding task associated with a particular site. The outstanding task is preferably associated with one or more items of interest to the user of the communication device. The communication device is provided with input of at least one proximity parameter for triggering a reminder for performing the outstanding task at the particular site. For example, the proximity parameter may specify the time available for completing the outstanding task. The communication device obtains information on its current location, and determines whether it is located within an area in which the outstanding task can be completed. This area is defined by a boundary established based at least in part on the geographic location of the particular site, and on the proximity parameter specified. Preferably, this boundary is automatically adjusted based on one or more factors such as the urgency of the outstanding task, the number of outstanding tasks that can be completed at the particular site or within the immediate vicinity, or user preferences, among others. A reminder is generated for the outstanding task when the communication device enters within this area defined by the boundary, and also preferably generated if the communication device leaves the site or area without receiving a notification of task completion.

Figure 1:
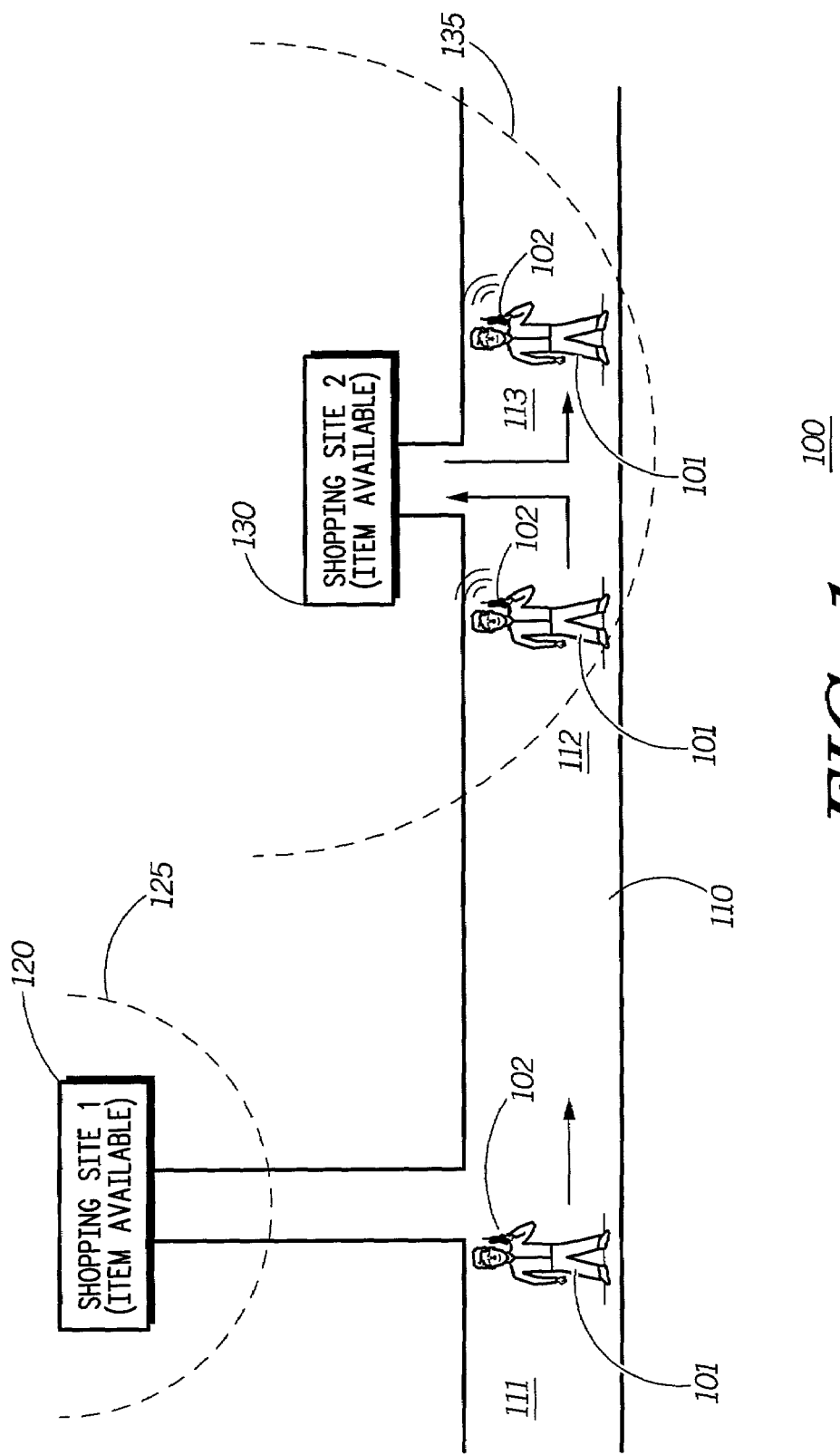
FIG. 1 shows a scenario of a shopping environment for depicting operation of a task reminder system on a mobile device, in accordance with the present invention.
Figure 2:
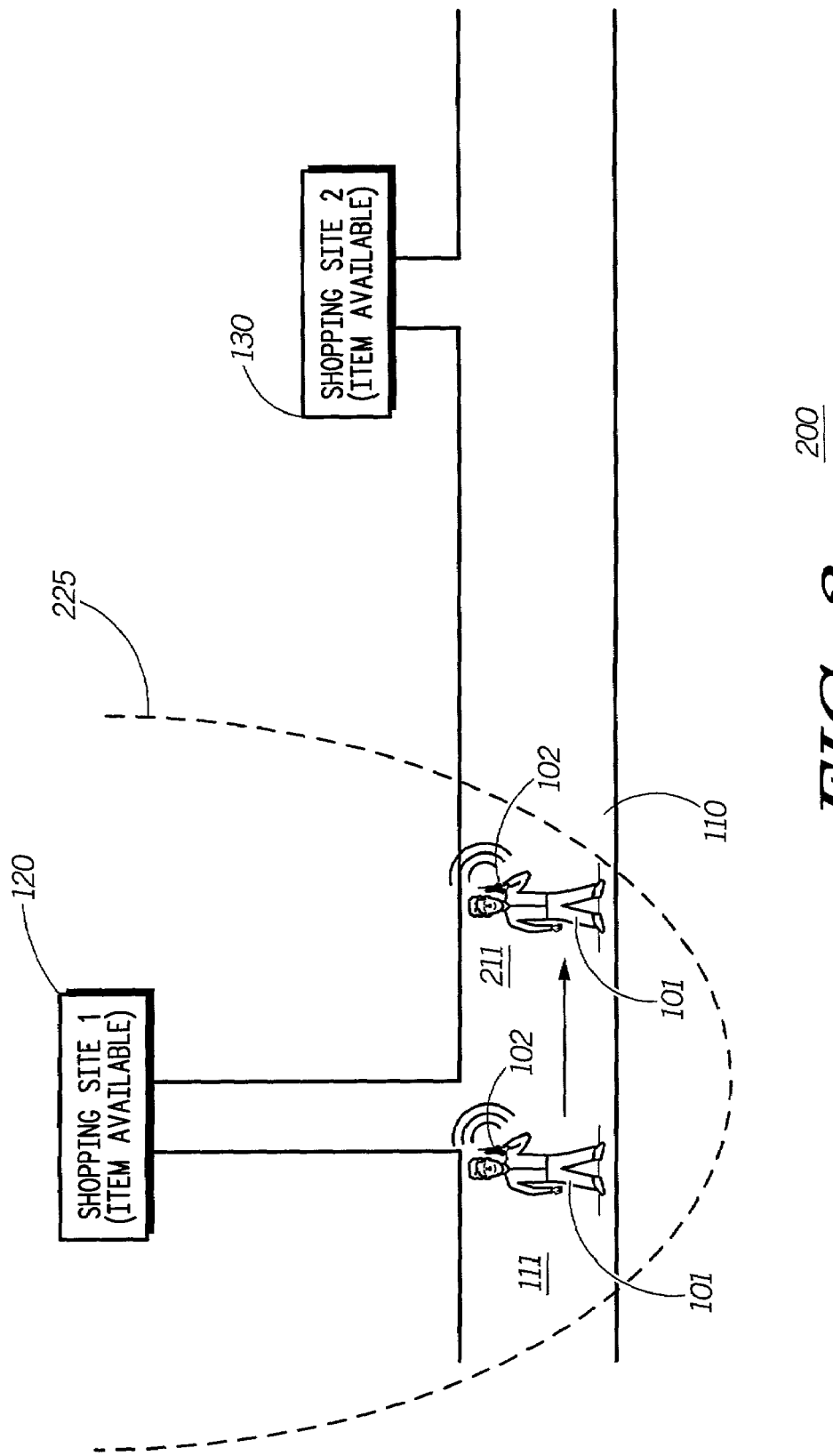
FIG. 2 shows another scenario of the shopping environment as a deadline for purchasing an item approaches, in accordance with the present invention.

FIG. 1 shows a first scenario of a shopping environment 100 for depicting device operation in accordance with the present invention. A user 101 is shown carrying a mobile communication device 102 while traversing a path 110. The user has programmed the mobile device with an outstanding task and proximity parameters for completing the task. In this scenario, the task is the purchase of a particular item, and the proximity parameters include the time available for completing the purchase, and a deadline for making the purchase. The mobile device has determined that the item is available for purchase at two shopping sites 120, 130, which are located at different distances away from the path 110. As the user travels along the path 110, the user 101 passes at point 111 within some distance of the first shopping site 120. Although the desired item is available at the first shopping site 120, the distance of the first shopping site 120 from the path 110 is sufficiently great such that the time required to complete the purchase at that site is outside the acceptable limits or boundary 125 established by the user. At point 112, the user 101 has traveled further along the path 110, and is within the vicinity of a second shopping site 130 that is significantly closer in distance to the path than the first shopping site 120. Significantly, the user is within a boundary 135 established by the user with respect to the second shopping site 130 for generating alerts. At this point in time, the communication device 102 generates an alert reminding the user of the outstanding task, i.e., the purchase of the item, and indicating that this task can be completed at the second shopping site 130 within the acceptable time constraints. The user, however, enters and exits the shopping site 130 without purchasing the item. Upon exiting the vicinity of the second shopping site, the communication device at point 113 generates another alert to the user indicating that the user is leaving the shopping site without having purchased the item. FIG. 2 shows a second scenario in which the user 101 is in the shopping environment as the deadline for purchasing the item approaches. Recall that the user had earlier declined to purchase the item. However, the approaching deadline has caused the communication device to automatically expand the boundary associated with the first shopping site, and in response to this new boundary 225, generates a reminder alert when the user travels to point 111 along the path 110 within the boundary. At point 211, the user is moving away from the shopping site 120 without stopping to purchase the item and is alerted with a message indicating that the user is passing the shopping site 120 without completing the task. These are but representative scenarios that serve to highlight significant aspects of the present invention, and are not meant to limit the scope of the invention.

Figure 3:
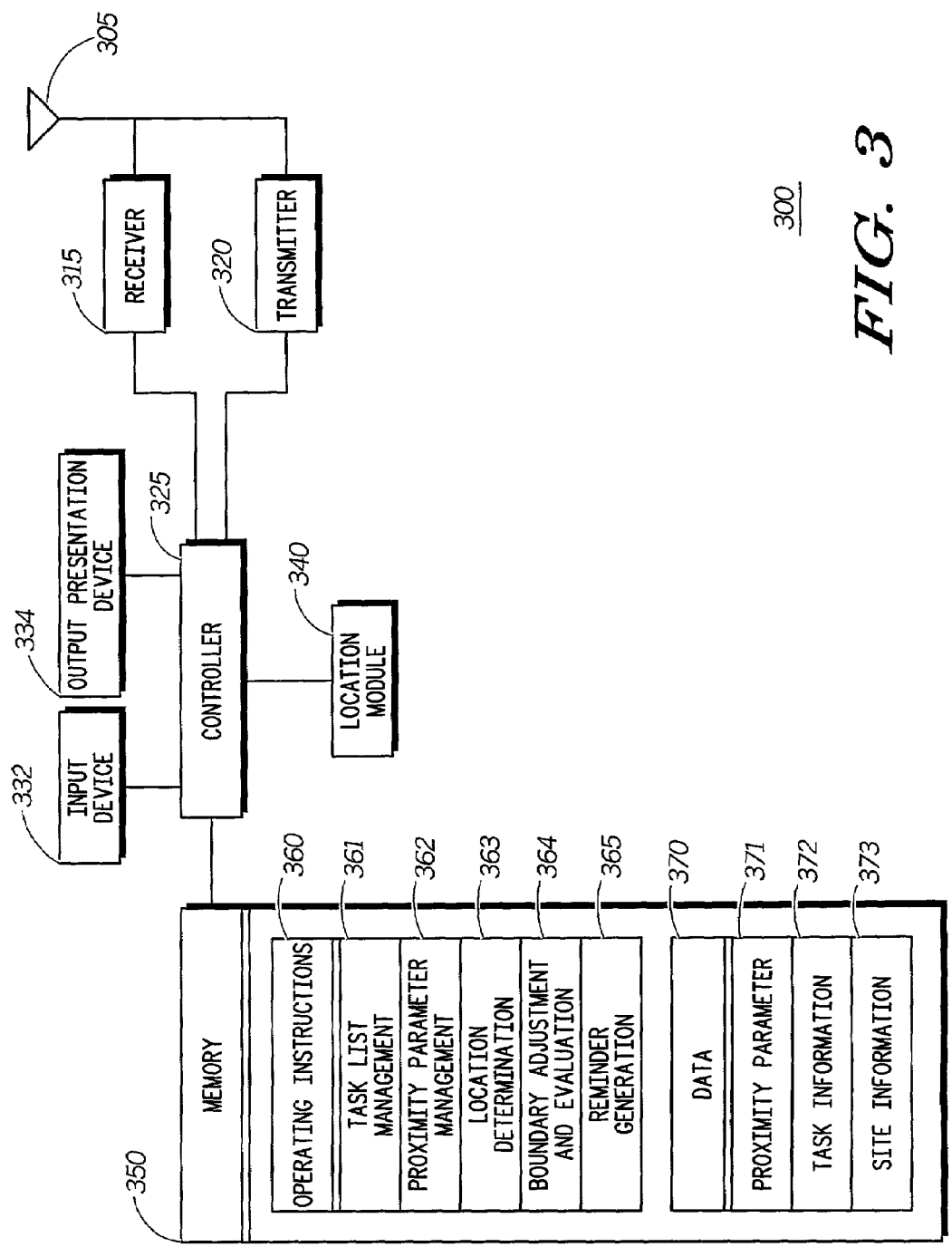
FIG. 3 shows a block diagram of a representative communication device, in accordance with the present invention.

FIG. 3 shows a block diagram of a representative communication device 300, in accordance with the present invention. The device 300 is preferably a smart mobile telephone or personal digital assistant (PDA) capable of wireless communications over radio frequency channels. In the device, a controller 325 governs the overall device function such as data reception, transmission, and input and output processing. A receiver 315 coupled to the controller 325 receives incoming messages from a communication channel via an antenna 305 and provides these messages to the controller 325. A transmitter 320, coupled to the controller 325, provides the capability of transmitting on the communication channel, data pertaining to device function or other communication requirements as needed. An input device 332 provides a means of inputting data into device applications and is preferably in the form of a keypad or touch screen. An output presentation device 334, preferably in the form of a display and audio device such as a speaker or tone generator, provides output to the user. A location module 340 provides current location information for the device. The location module is preferably based on the well-known Global Positioning Satellite (GPS) system, but may also utilize other technologies for precise location determination, such as time difference of arrival and received signal strength indication instead of or in conjunction with GPS techniques.

A memory module 350 stores operating instructions and data for the device. Specifically, the memory 350 includes operating instructions 360 for such procedures as task list management 361, proximity parameter management 362, location determination 363, boundary adjustment and evaluation 364, and reminder generation 365, among others The procedures and steps implemented by the various operating instructions 361, 362, 363, 364, 365 are described in more detail below. The memory 350 also includes a data area 370 for storing proximity parameters 371, task information 372, and site information 373, including user preferences and configuration data.

Figure 4:
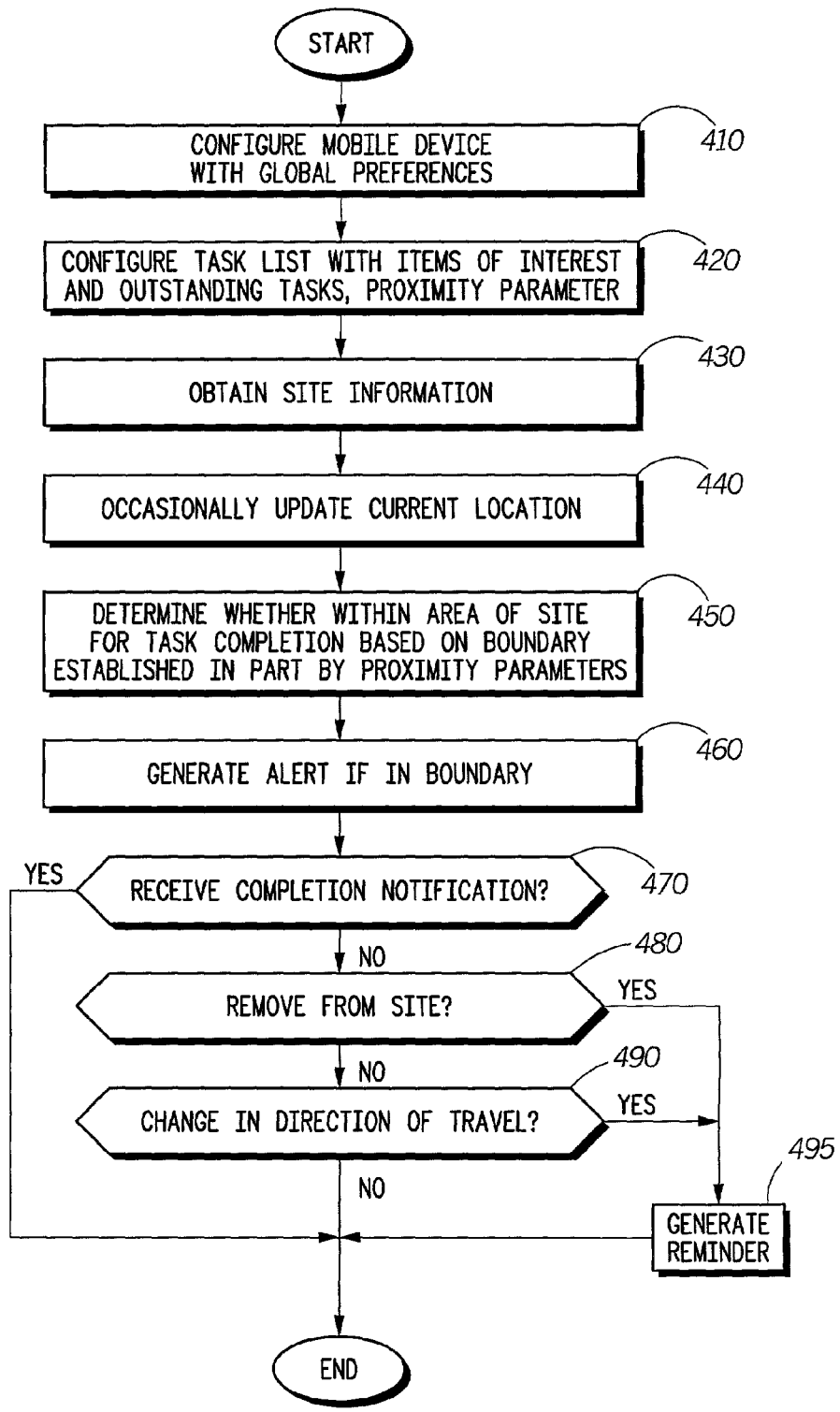
FIG. 4 shows a flowchart of procedures for operating the mobile device, in accordance with the present invention.

FIG. 4 shows a flowchart of procedures 400 for operating the mobile device, in accordance with the present invention. The user preferably configures the mobile device with global preferences such as home location, home coverage area, scaling factors, and site preferences, step 410. The home location is the base from which the user operates. For example, the home location can be a street address that the user wants to use as a reference point to center the home coverage area. This could be manually entered or automatically determined in response to a command given to the mobile device. The home coverage area is preferably a range expressed in time and/or distance, and is used to set an outer boundary for possible site locations at which to complete a task. Scaling factors may take a variety of forms and include a multitask factor, a cost scaling factor, deadline scaling factor, and preferred site factor. The multitask scaling factor is used to vary a boundary based on the ability to complete multiple tasks at a given site. For example, a factor of 50 percent would enable a boundary to be expanded by 50 percent if two or more tasks can be performed during a single visit to a particular site. The cost scaling factor is used to vary a boundary based on the cost differential of completing a task at one site versus another. The deadline scaling factor is used to vary a boundary based on an approaching deadline. Site preferences provide information on user preferred sites, which can be expressed by site location by site type. Examples include business names and business types. The mobile device can also be configured with an exclusion list, which lists sites that should not be considered, and/or an inclusion list that provides an exclusive list of sites that should be considered.

According to the invention, the mobile device is configured with a task list having one or more tasks for which reminder alerts are generated based on the proximity of the mobile device to a site at which the tasks can be completed, step 420. In the preferred embodiment, the controller operates the input device to receive from the user, information on an item of interest and information on an outstanding task associated with the item of interest, and to obtain criteria for triggering a reminder for the outstanding task. The mobile device also accepts a date for activating the task and any critical dates or deadlines associated with the task. The mobile device is also provided with one or more proximity parameters that are used for triggering a reminder for the task. Proximity parameters are preferably expressed as specifications of acceptable task completion time, maximum travel distance, maximum travel time, or combinations thereof. For example, a proximity parameter may be specified as requiring the mobile device to be within 5 kilometers or 10 minutes of a particular site, or as an allocation of a maximum of 15 minutes for completing a particular task. Preferably, a first proximity parameter is specified for establishing a boundary issuing an initial alert, and a second proximity parameter is specified for adjusting the boundary in response to an approaching critical date. The mobile device also accepts from the user site preferences associated with a particular task as part of the task configuration, as well as a site inclusion or exclusion list associated with a particular task.

FIG. 5 shows a portion of a task list 500 derived from user configuration, in accordance with the present invention. The task list shows two entries 510, 520 having a description of an item of interest, an associated task, a start proximity, an end proximity, and an optional deadline. In the first entry 510, the item interest is a "Digital Camera," the outstanding task is a "Purchase," the start proximity is "15 minutes/5 kilometers," the end proximity is "15 minutes/5 kilometers," and there is no deadline entry. In the second entry 520, the item of interest is an "FPL Bill," the outstanding task is to "Pay Bill," the start proximity is "10 minutes/5 kilometers," the end proximity is "20 minutes/10 kilometers," and there is a deadline entry of "May 31, 2002."

Referring back to FIG. 4, after obtaining the task list configuration, the mobile device selects one or more sites based on the site's association with the item of interest and the corresponding task, and the site's geographic location, step 430. Preferably, the controller causes the transceiver to query a network for information on at least one site that is associated with the item of interest and for geographic location information corresponding to the site. A site's inclusion in any resultant site list is also governed or limited by any pre-configured site inclusion or exclusion list.

FIG. 6 shows a portion of the site information derived for an entry 510 in the task list of FIG. 5, in accordance with the present invention. The query results provided for entries 610, 620, 630, 640, for various sites, and include such information as site name, location, characteristics, and preferences. Particularly, two entries 610 are shown for the store "PRO-CAMERA," while other entries are shown for the stores "CAMERA-DISCOUNT" 630, and "JOE'S DIGITAL" 640. The outstanding task is capable of being completed at each of these sites, and the user desires an alert when the device is located within a certain proximity with respect to these sites.

Referring back to FIG. 4, the mobile device occasionally uses its location module to determine its current location, direction of travel, and speed, step 440. The frequency with which the current location is updated may vary depending on the rate or direction of travel for the mobile device, and/or distance from task sites or task site reminder boundaries. The mobile device then determines whether it is located within an area in which the outstanding task can be completed, step 450. This area is defined by a boundary established based at least in part on the geographic location of a particular site associated with a task, and on at least one proximity parameter associated with the particular site. This boundary is automatically expanded or otherwise adjusted based on an approaching deadline or other urgency factor associated with the outstanding task; the number of outstanding tasks associated with, or that can be completed at, a particular site; the characteristic of the item of interest at the site; a user-defined preference factor associated with the site; and/or other characteristics associated with the site. Thus, the location at which a user is issued an alert may vary over time with respect to a given site for the same task entry.

Determining whether the mobile device is within the boundary depends in part on how the boundary is defined. For example, when the boundary is defined by the time available to complete the task at the site, the mobile device estimates the travel time to the site. The travel time along with an estimate of time required at the site to complete the task is used in determining whether the mobile device is within the boundary. When the boundary is defined by maximum travel distance to the site, the device current location is compared to the geographic location of the site to determine travel distance to the site. Note that for boundary purposes in the preferred embodiment, the important parameter is the travel distance rather than the absolute distance as measured between the device's current location and the location of the site. Note also that the device may enter a task site boundary by changing the device location from outside the boundary to inside the boundary and/or by changing the boundary to include the location of the device. It should also be appreciated that the device may employ time constraints, filters, and/or hysteresis to prevent the generation of undesired action when the device is entering and exiting the boundary-defined area at high rate.

The mobile device generates a reminder for the task when the task is outstanding and the device enters or is located within the boundary-defined area describe above, step 460. In one embodiment, after the device determines it is within a boundary and before it generates the reminder alert, the device updates the associated site information to confirm the boundary is still valid. Preferably, the communication device presents on its output device an output that identifies a particular site having or otherwise associated with the item of interest, and the corresponding outstanding task. Additional information, such as price and availability of the item of interest, is made available when the site is a shopping venue. Upon performing the outstanding task, the user provides, or the device automatically obtains, a notification of completion, and this notification of completion automatically recorded, step 470. However, if the mobile device is removed from the immediate vicinity of the site or from within the boundary-defined area without receipt of the notification of completion, an alert or reminder to that effect is generated, step 480, 495. Additionally, a reminder is also generated for the outstanding task when the mobile device has a direction of travel that changes from toward the site to a direction of travel away from the site without the device receiving a notification of completion for the outstanding task, step 490, 495.

The present invention provides significant advantages over the prior art. Users can better manage their tasks by automatically generating reminders based on location and site characteristics. Further, by allowing for automatic adjustment of boundary conditions based on preferences and task characteristics, substantial flexibility is added.

While the above description is of the preferred embodiment of the present invention, it should be appreciated that the invention may be modified, altered, or varied without deviating from the scope and fair meaning of the following claims.

What is claimed is:

1. A method for a communication device to generate a reminder for a user of a communication device, the method comprising the steps of:
   (a) obtaining via an input device of the communication device, information on an item of interest to the user, an outstanding task associated with the item of interest and an urgency factor associated with the outstanding task;
   (b) selecting, by the communication device, at least one site based on an association with the item of interest, and on geographic location information corresponding to each site;
   (c) accepting as input to the communication device at least one proximity parameter with respect to the at least one site for triggering a reminder for the outstanding task;
   (d) occasionally determining current location of the communication device; and
   (e) determining whether the communication device is within an area in which the outstanding task can be completed, which area is defined by a boundary established based at least in part on the geographic location of the at least one site and on the at least one proximity parameter corresponding to the at least one site, and automatically adjusting the boundary based on an urgency factor associated with the outstanding task;
   (f) generating a reminder for the outstanding task when the communication device is within the boundary defined area.

2. The method of claim 1, wherein the at least one proximity parameter comprises a specification of acceptable task completion time.

3. The method of claim 1, wherein the at least one proximity parameter comprises a specification of maximum travel distance.

4. The method of claim 1, wherein step (d) comprises the step of adjusting the frequency of obtaining current location information based on a rate of travel associated with the communication device.

5. The method of claim 1, wherein step (e) comprises the step of determining travel distance to the at least one site.

6. The method of claim 1, wherein step (e) comprises the step of determining travel time to the at least one site.

7. The method of claim 1, wherein the step of automatically adjusting the boundary comprises the step of expanding the boundary in response to an approaching deadline associated with the outstanding task.

8. The method of claim 1, wherein step (e) comprises the step of automatically adjusting the boundary based on number of outstanding tasks associated with the at least one site.

9. The method of claim 1, wherein step (b) comprises the steps of: obtaining from the user an exclusion set that identifies excluded sites; and selecting the at least one site based in part on the exclusion set.

10. The method of claim 1, wherein step (b) comprises the steps of: obtaining from the user an inclusion set that identifies acceptable sites; and limiting selection of the at least one site to sites contained in the inclusion set.

11. The method of claim 1, further comprising the step of, automatically obtaining a notification of completion for a particular outstanding task; and automatically recording completion of the particular outstanding task upon obtaining the notification of completion.

12. The method of claim 1, further comprising the step of, generating to the user, a reminder for the at least one outstanding task when the communication device is removed from the at least one site without receiving a notification of completion for the at least one outstanding task.

13. The method of claim 1, further comprising the step of, generating to the user, a reminder for the at least one outstanding task when the communication device is removed from within the boundary established by the at least one proximity parameter without receiving a notification of completion for the at least one outstanding task.

14. The method of claim 1, further comprising the step of, generating a reminder for the at least one outstanding task when the communication device has a direction of travel that changes from toward the at least one site to a direction of travel away from the at least one site without receiving a notification of completion for the at least one outstanding task.

15. A communication device, comprising: an input device;

a transceiver;

a location module;

an output device;

a memory having operating instructions for:

causing the input device to receive information on an item of interest and on an outstanding task associated with the item of interest, and for obtaining criteria for triggering a reminder for the outstanding task;

causing the location module to determine current location of the communication device;

causing the transceiver to query a network for information on at least one site that is associated with the item of interest, and for geographic location information corresponding to the at least one site;

selecting at least one particular site from the at least one site;

determining whether the communication device is within an area in which an outstanding task can be completed, which area is defined by a boundary established based at least in part on the geographic location of the at least one site, and on the at least one proximity parameter corresponding to the at least one particular site;

operating the output device to present a reminder for the outstanding task when the communication device is within the boundary defined area;

a controller operable to control the memory, input device, location module, transceiver, and output device according to the operating instructions.

\* \* \* \* \*